United States Patent [19]

Colvin

[11] 4,142,754
[45] Mar. 6, 1979

[54] FISH BRAILER

[76] Inventor: James W. Colvin, 1477 4th St., Astoria, Oreg. 97103

[21] Appl. No.: 805,536

[22] Filed: Jun. 10, 1977

[51] Int. Cl.$^2$ .................. B66C 1/12; A01K 73/06
[52] U.S. Cl. ........................................ 294/77; 43/8; 254/137
[58] Field of Search ............... 294/77, 76, 69; 43/7, 43/8, 10; 214/15 R, 13 R, 38 CA; 114/255; 254/137

[56] References Cited

U.S. PATENT DOCUMENTS

| | | | |
|---|---|---|---|
| 2,440,712 | 5/1948 | Bickell | 294/77 |
| 3,113,394 | 12/1963 | Puretic | 403/8 |

*Primary Examiner*—James B. Marbert
*Attorney, Agent, or Firm*—Lee R. Schermerhorn

[57] ABSTRACT

A series of bag shaped nets is hung in the fish locker of a ship or barge to receive fish caught in the ocean. Each net has four suspension loops on its upper end and hanger hooks are arranged in the locker to hold the top ends of the nets open in rectangular configuration in side by side relation with no gaps between adjacent nets so that all fish dropped into the locker will fall into the nets. At a shore station the filled nets are lifted out of the locker one at a time by a crane. One form of net has an open bottom end which is closed by a pucker rope. The contents of the net are discharged by releasing the pucker rope. In a modification, the net has a closed lower end connected to one end of a suspension rope. When a filled net is to be removed from the locker on a ship the other end of the suspension rope is connected to a crane hook and a bight in the rope is passed through the four suspension loops and supported on a releasable crane hook. Release of the releasable hook upends the net to discharge its contents.

8 Claims, 8 Drawing Figures

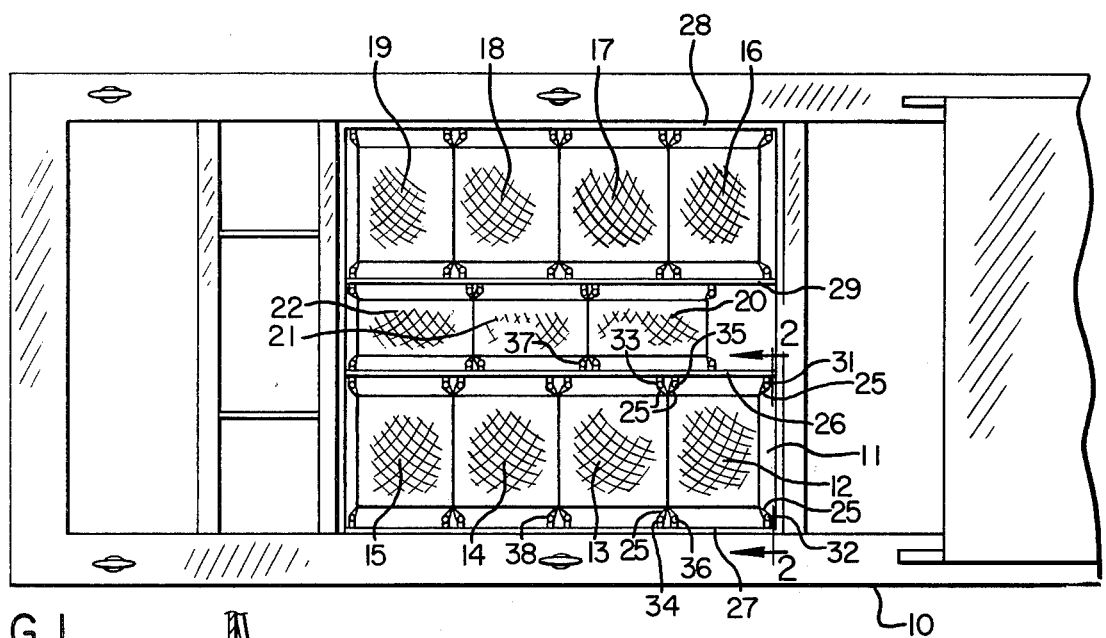
FIG. 1
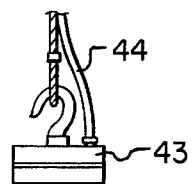
FIG. 4
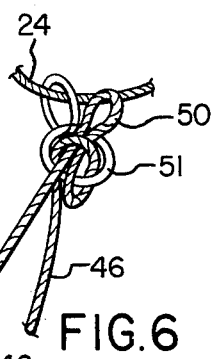
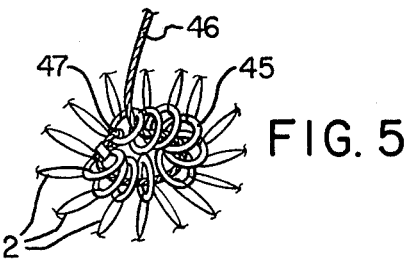
FIG. 5
FIG. 6
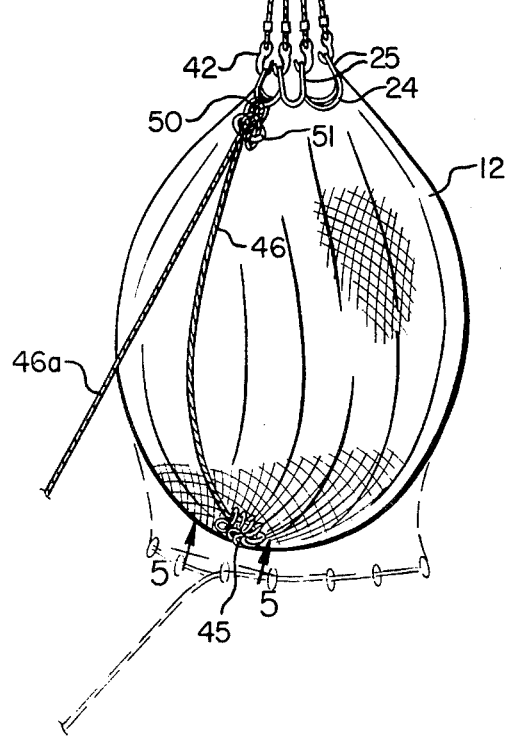
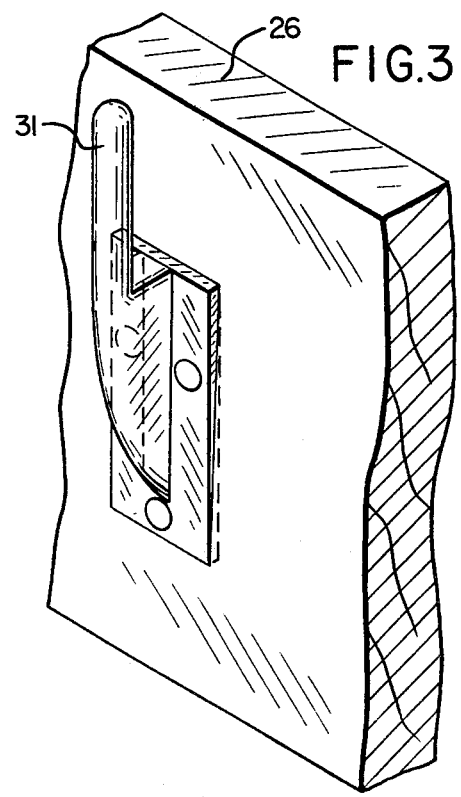
FIG. 3

FISH BRAILER

BACKGROUND OF THE INVENTION

This invention relates to a fish brailer for use in a ship or barge to facilitate handling of fish caught at sea.

Although the invention is not limited to any particular type of fishing it is of especial advantage in gill net fishing where fish are removed one at a time by hand from a gill net and deposited in a fish locker in the ship. When the ship returns to port it has herefore been a time consuming operation to remove the many tons of fish that must be handled and devices herefore proposed for expediting this work have often resulted in damage to the fish, reducing their commercial value.

Objects of the invention are therefore to provide a novel and efficient fish brailer for unloading fish from a ship or barge, to provide a fish brailer which facilitates the unloading of fish without damaging the fish and to provide an improved arrangement of nets by which the fish may be easily and quickly removed by a crane and the contents discharged from the nets at a port facility.

SUMMARY OF THE INVENTION

According to the present invention a series of bag-shaped nets is hung in side by side relation with their open tops in rectangular configuration so that all fish deposited in the fish locker of a ship will fall into one or another of the nets. At port the fish are unloaded by merely lifting the nets out of the fish locker by a crane.

In one embodiment each net has an open lower end which is closed by a pucker rope. Release of the pucker rope opens the lower end of the suspended net to discharge its contents.

In a modification each net has a closed lower end connected to one end of a suspension rope. The other end of the suspension rope is connected to a hook on the lifting crane and a bight in the rope is passed through suspension loops on the top of the net and engaged with a releasable hook on the crane. Release of the releasable hook upends the net and allows the top to open for discharge of its contents.

The invention will be better understood and additional objects and advantages will become apparent from the following detailed description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 1 is a fragmentary top plan view of a ship or barge showing the arrangement of the nets in the fish locker.

FIG. 3 is a fragmentary perspective view showing one of the net hanger hooks in the fish locker.

FIG. 4 is a side elevation view of a filled net lifted out of the fish locker by a crane.

FIG. 5 is a view on the line 5—5 of FIG. 4.

FIG. 6 is an enlarged view of the slip-knot in FIG. 4.

DESCRIPTION OF THE PREFERRED EMBODIMENTS

Figure 2:
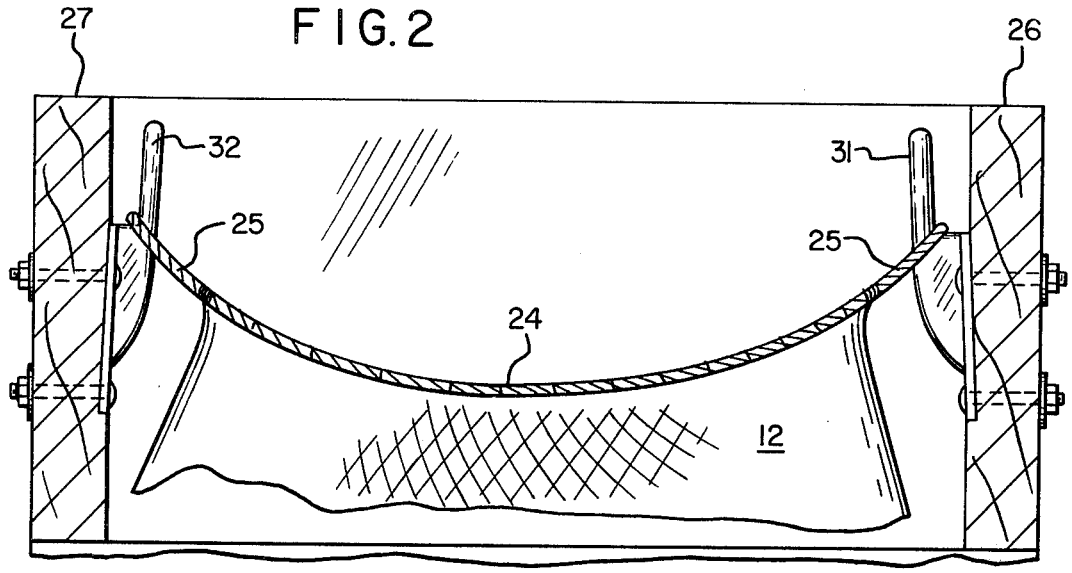
FIG. 2 is an enlarged view on the line 2—2, FIG. 1.

In FIG. 1 the ship or barge 10 has a fish locker 11 containing a plurality of bag-shaped nets 12-22. Each net is suspended by a circumferential neck rope 24 having four suspension loops 25. The nets in each row, such as nets 12-15, hang between a pair of parallel spaced apart longitudinally extending crib planks 26 and 27 which are disposed on edge in vertical planes. In a similar manner the nets 16-18 hang between crib planks 28 and 29 and nets 20-22 hang between crib planks 29 and 26.

Longitudinal horizontal walk planks (not shown) normally cover the nets 12-22. When fish are to be dropped into the nets, the central walk planks are removed, leaving marginal walk planks in place over each row of nets 12-15, 16-19 and 20-22 to cover the gaps between the nets and crib planks 26,27, 28 and 29. When the nets filled with fish are to be lifted out of locker 11, all the walk planks are removed, as shown in FIG. 1.

Two of the suspension loops 25 on net 12 hang on hooks 31 and 32 on the respective crib planks 26 and 27 while the other two suspension loops 25 on net 12 hang on hooks 33 and 34 on the respective crib planks. Thus, the hooks 31-34 hold the top of the net 12 open in rectangular configuration.

In order to prevent any open space between adjacent nets, the adjacent suspension loops 25 on net 13 cross the suspension loops on net 12 to hang on hooks 35 and 36 which are on the right side of hooks 33 and 34 in FIG. 1. The other two suspension loops 25 on net 13 hang on hooks 37 and 38, crossing the adjacent suspension loops 25 on net 14.

This hanging arrangement is carried out in the same manner with respect to all adjacent edges of adjacent nets so that there is no gap between adjacent nets and any fish dropped at random into the fish locker 11 will fall into one or another of the nets 12-22. This makes it possible to unload the fish in a very simple manner by merely lifting the filled nets out of fish locker 11 one at a time by crane.

The construction of net 12 is illustrated in FIGS. 4, 5, and 6, the other nets 13-22 being identical. When the ship 10 reaches port with filled nets the nets and their contents are removed by a crane having a crane hook 40 and sling 41 with four hooks 42. Each hook 42 is engaged in one of the net suspension loops 25 and net 12 is lifted off its four hanger hooks 31-34. This is the condition illustrated in solid lines in FIg. 4.

Crane hook 40 preferably includes a conventional diaphram type weighing device 43 connected through a fluid conduit 44 with a weighing mechanism which indicates the weight of the load as soon as the net has been lifted free of the fish locker hanger hooks 31-34.

The net 12 in FIG. 4 has an open bottom equipped with a series of rigid pucker rings 45 as seen in FIG. 5. A pucker rope 46 is threaded through the rings 45 with its lower end anchored to one of the pucker rings at 47 whereby the tensioning of the upper end of pucker rope 46 closes the bottom of the net to retain its contents. The bottom of the net is held closed by tying an upper portion of pucker rope 46 to a rigid ring 51 with a slip knot 50 as shown in FIG. 6. Ring 51 is attached to neck rope 24.

When the filled net FIG. 4 is positioned over a receptacle to receive the fish a pull on the free end 46a of the pucker rope unties the slip-knot 50 and allows the rope to drop free of ring 51 and slide through pucker rings 45 to open the bottom of the net as shown in broken lines. The net 12 may than be returned to the ship 10 and the rest of the nets removed and emptied one by one in the same manner. A pull cord may be attached to the free end 46a of the pucker rope.

Figure 7:
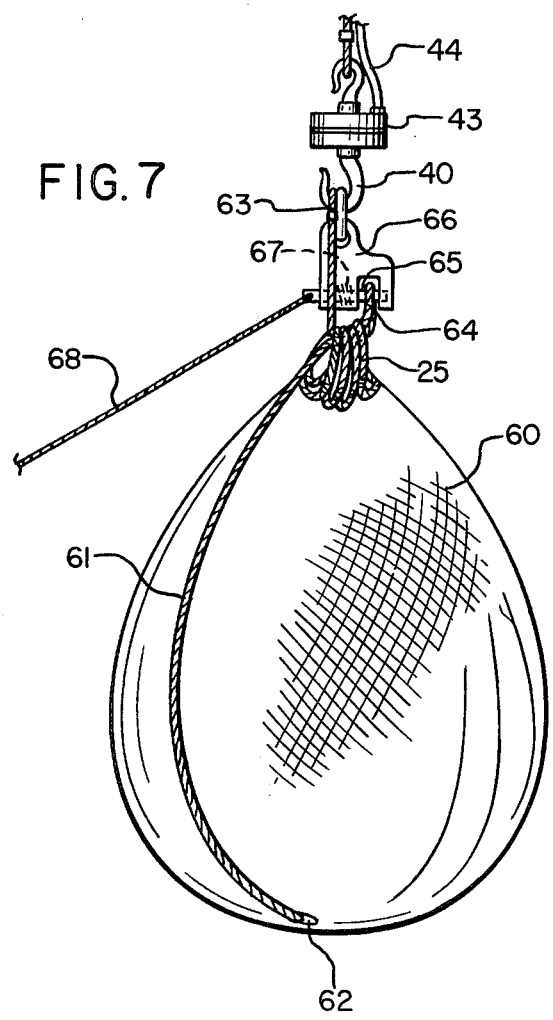
FIG. 7 is a view similar to FIG. 4 showing a different form of net and lifting hook.
Figure 8:
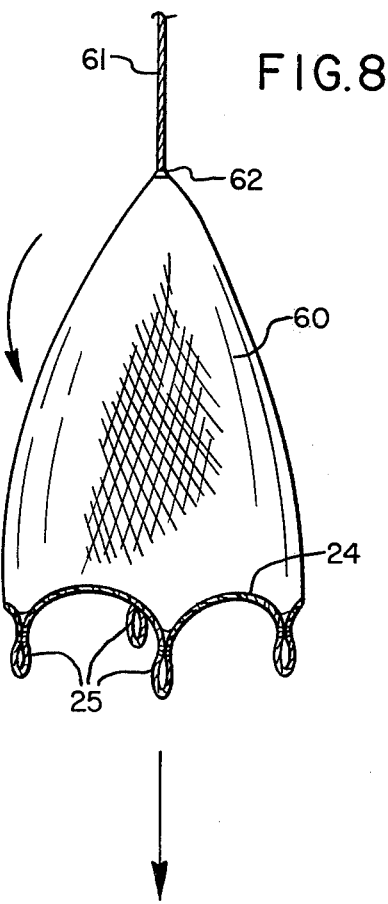
FIG. 8 shows the net in FIG. 7 in upended discharge position.

In the modification in FIGS. 7 and 8 the net 60 has a permanently closed bottom end. The upper end of the net is the same as the upper end of net 12 for hanging a series of the nets 60 in the fish locker 11 as shown in FIG. 1. In FIG. 7 a suspension rope 61 has its lower end connected to the bottom of the net at 62. The upper end of rope 61 is equipped with an eye splice 63 to hang on crane hook 40. A bight 64 in the rope is passed through the four suspension loops 25 on the top end of the net and engaged on a sliding pin 65 in a conventional release hook 66 also hanging on crane hook 40. Pin 65 is held in supporting position by a compression spring 67.

When filled net 60 has been positioned over a receptacle to receive its load of fish, pin 65 is withdrawn to the left by a pull cord 68 to release the bight 64 in suspension rope 61. This frees the bight 64 to slide out of suspension loops 25 and release the top end of the net allowing the net to up-end and discharge its contents as shown in FIG. 8.

If desired, release hook 66 may be released by other means such as various available electric, hydraulic or pneumatic devices under remote control.

The nets 12 and 60 are preferably designed to hold a ton or more of fish whereby with either embodiment the fish locker in a ship may be quickly unloaded to avoid loss of valuable time in port. Unloading time is an important consideration in the fishing industry.

What is claimed is:

1. A fish brailer for a ship or barge comprising a plurality of bag-shaped nets having closed bottom ends and open top ends, four suspension loops on the top end of each net, a pair of spaced apart parallel crib planks in a fish locker in said ship, said planks extending in a horizontal direction and disposed in vertical planes, and pairs of net hanger hooks mounted at intervals along confronting faces of said crib planks, said suspension loops of adjacent nets overlaping each other and hung on said hooks so as to hold said open top ends of the nets in rectangular configurations with adjacent sides of the nets abutting each other and leaving no open spaces between the nets whereby said open tops of the nets span substantially the entire area of said locker to receive all the fish deposited in the locker.

2. A fish brailer as defined in claim 1 including additional parallel crib planks having said pairs of net hanger hooks to hang a plurality of rows of said nets in side by side relation.

3. A fish brailer as defined in claim 1, each net having an open bottom end which is closed by a pucker rope passing through a series of pucker rings on said bottom end, means securing said pucker rope to hold said bottom end closed, and means to release said securing means and allow said bottom end to open and discharge the contents of the net when the filled net has been lifted out of said locker.

4. A fish brailer as defined in claim 3, said securing means comprising a ring connected to said net and a slip knot in said pucker rope tying said rope to said ring, said rope having one end hanging free to untie said slip knot.

5. A fish brailer as defined in claim 1, each net having a permanently closed bottom end, a suspension rope connected at one end to said bottom end of the net with a bight in said rope passed through said suspension loops and the other end of the rope secured to a crane hook when the net and its contents are to be lifted out of said locker, a releasable crane hook supporting said bight to hold said net upright, and means for releasing said releasable hook to release said bight, upend said net and discharge its contents.

6. A fish brailer as defined in claim 5, said releasing means comprising a pull cord.

7. A fish brailer comprising a tubular net having open top and bottom ends, a neck rope having four suspension loops on the top end of the net for hanging the net with said top end open in rectangular configuration for filling the net, said bottom end being closed by a pucker rope passing through a series of pucker rings on said bottom end, a ring secured to said neck rope, and a slip knot in said pucker rope tying said pucker rope to said ring, one end of said pucker rope hanging free for untieing said knot and releasing said pucker rope from said last ring to open the bottom of the net and discharge the contents of the net.

8. A fish brailer comprising a bag-shaped net having an open top end and a closed bottom end, four suspension loops on the top end of the net for hanging the net with said top end open in rectangular configuration for filling the net, a suspension rope connected at one end to said bottom end of the net with a bight in said rope passed through said suspension loops and the other end of the rope secured to a crane hook when the net and its contents are to be lifted and moved to an emptying position, a releasable crane hook supporting said bight to hold said net upright with said net supported by said bight in said suspension loops, and means for releasing said releasable hook from said bight to upend said net and discharge its contents, the release of said hook from said bight allowing said bight to withdraw from said suspension loops and leave the top end of the net unsupported.

* * * * *